US008965874B1

(12) United States Patent
Vassilakis et al.

(10) Patent No.: US 8,965,874 B1
(45) Date of Patent: Feb. 24, 2015

(54) DYNAMIC AGGREGATION OF USERS

(75) Inventors: Theo Vassilakis, Kirkland, WA (US); Kevin C. Zatloukal, Kirkland, WA (US); Ashish Raniwala, Bellevue, WA (US); Deepak A. Menon, Redmond, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/620,356

(22) Filed: Sep. 14, 2012

Related U.S. Application Data

(63) Continuation of application No. 11/462,668, filed on Aug. 4, 2006, now abandoned.

(51) Int. Cl.
*G06F 7/00* (2006.01)
*G06F 17/30* (2006.01)

(52) U.S. Cl.
USPC ............................. 707/706; 707/771; 705/319

(58) Field of Classification Search
CPC ....................... G06F 17/30867; H04L 12/1822
USPC ........... 707/705, 706, 722, 758, 771; 705/319
See application file for complete search history.

(56) References Cited

U.S. PATENT DOCUMENTS

| 6,029,195 | A | 2/2000 | Herz |
| 6,128,613 | A | 10/2000 | Wong et al. |
| 6,393,460 | B1 | 5/2002 | Gruen et al. |
| 6,446,113 | B1 | 9/2002 | Ozzie et al. |
| 6,687,696 | B2 | 2/2004 | Hofmann et al. |
| 6,711,585 | B1 | 3/2004 | Copperman et al. |
| 6,766,374 | B2 | 7/2004 | Trovato et al. |
| 6,950,852 | B1 | 9/2005 | Kobayaghi et al. |
| 7,120,927 | B1 | 10/2006 | Beyda et al. |
| 2001/0056465 | A1 | 12/2001 | Aiso |
| 2002/0143759 | A1* | 10/2002 | Yu ...................................... 707/5 |
| 2002/0152101 | A1 | 10/2002 | Lawson et al. |
| 2003/0021238 | A1 | 1/2003 | Corneliussen et al. |
| 2003/0041058 | A1* | 2/2003 | Ibuki et al. ......................... 707/4 |
| 2003/0225833 | A1 | 12/2003 | Pilat et al. |
| 2004/0078432 | A1 | 4/2004 | Manber et al. |
| 2004/0083263 | A1 | 4/2004 | Richardson et al. |
| 2004/0098449 | A1 | 5/2004 | Bar-Lavi et al. |
| 2004/0111467 | A1* | 6/2004 | Willis ........................... 709/203 |
| 2004/0199498 | A1 | 10/2004 | Kapur et al. |
| 2004/0260701 | A1 | 12/2004 | Lehikoinen et al. |
| 2005/0071741 | A1* | 3/2005 | Acharya et al. ................ 715/500 |
| 2005/0154693 | A1 | 7/2005 | Ebert |

(Continued)

OTHER PUBLICATIONS

"Implementing Rich Collaboration Infrastructure Using Microsoft Windows SharePoint Services and Microsoft Office SharePoint Portal Server 2003," White Paper, Microsoft Corporation, Oct. 2003, 14 pp.

(Continued)

*Primary Examiner* — Marc Somers
(74) *Attorney, Agent, or Firm* — Morgan, Lewis & Bockius LLP

(57) ABSTRACT

While using an online application, information received or selected by a user is associated with a context. For example, a search query is received from a user and the search query is associated with a context. The user is provided with a recommendation to join a discussion forum that corresponds to the context, thereby dynamically aggregating users. The recommendation may be provided conditionally, if predefined criteria are satisfied. Alternately, in some embodiments a recommendation may be made unconditionally.

19 Claims, 12 Drawing Sheets

(56) References Cited

U.S. PATENT DOCUMENTS

2006/0004775 A1   1/2006   Kobayaghi et al.
2006/0176831 A1   8/2006   Greenberg et al.
2006/0248068 A1  11/2006  Chien et al.

OTHER PUBLICATIONS

"Deciding When to Deploy Microsoft Windows SharePoint Services and Microsoft Office SharePoint Portal Server 2003," White Paper, Microsoft Corporation, Oct. 2004, 10 pp.

* cited by examiner

DYNAMIC AGGREGATION OF USERS

RELATED APPLICATIONS

This application is a continuation of U.S. patent application Ser. No. 11/462,668, filed Aug. 4, 2006, entitled "Dynamic Aggregation of Users," which is hereby incorporated by reference in its entirety.

FIELD OF THE INVENTION

The present invention relates generally to aggregation of users. More specifically, the present invention relates generally to a system and method for dynamically aggregating users into forums, such as chat rooms, based on search queries and search engine statistics or other indicia of topics of potential interests to users.

BACKGROUND

Networks, such as the World Wide Web (WWW) or Internet, are powerful tools that allow people to access information and communicate with one another. One popular mechanism for using these networks to meet and interact with people are online social networks. This category includes a range of applications, such as chat rooms and listserv groups, that allow users to discuss a variety of pre-determined topics.

Unfortunately, the ever-changing nature of people's interests, for example, based on current events, is often at odds with the pre-determined nature of these environments, and it may be challenging to keep these communication environments topical and relevant to the current interests of users. As a consequence, these applications are often lagging indicators of users' interests.

Furthermore, by their nature chat rooms and groups target audiences that have at least a minimum size. As such, it is often difficult for users who are interested in less popular topics to find and communicate with one another.

There is a need, therefore, for improved social networks that address the aforementioned challenges.

SUMMARY OF DISCLOSED EMBODIMENTS

In some embodiments of a method and related system for dynamically aggregating users, a search query is received at a search engine system, via a communications network, from a client system associate with a user. The search engine system associates the search query with a context. The search engine provides to the client system, via the communications network, a response to the search query. The response includes a recommendation to join a discussion forum that corresponds to the context associated with the search query, and a list of user-selectable search results to the search query for concurrent display at the client system with the recommendation. The recommendation provided in the response includes a user-selectable link to an online location of the discussion forum, wherein the link to the online discussion is configured to direct an application executed by the client system to access the discussion forum via the communications network.

In some embodiments, the method further includes automatically, at a server system comprising the search engine system or another server system distinct from the client system, establishing the discussion forum in response to a change in search engine statistics. In some implementations, the change in the search engine statistics includes a difference between a first frequency and a baseline frequency, the first frequency comprising a frequency with which search queries corresponding to the context are received from a first plurality of users during a first time interval, and the baseline frequency comprising a frequency with which search queries corresponding to the context are received from a second plurality of users during a baseline time interval that precedes the first time interval. In some implementations, the search engine statistics further include variations in the baseline frequency as a function of time.

In some embodiments, the user-selectable link to an online location of the discussion forum comprises a link to a chat room.

In another aspect, a search engine system includes one or more processors and memory storing one or more programs for execution by the one or more processors. The one or more programs include instructions for receiving at the search engine system, via a communications network, a search query from a client system associated with a user, instructions for associating the search query with a context, and instructions for providing to the client system, via the communications network, a response to the search query. The response includes a recommendation to join a discussion forum that corresponds to the context associated with the search query, and a list of user-selectable search results to the search query for concurrent display at the client system with the recommendation. The recommendation provided in the response includes a user-selectable link to an online location of the discussion forum, wherein the link to the online discussion is configured to direct an application executed by the client system to access the discussion forum via the communications network.

In yet another aspect, a non-transitory computer readable storage medium stores one or more programs configured for execution by a search engine system having one or more processors. The one or more programs include instructions for receiving at the search engine system, via a communications network, a search query from a client system associated with a user, instructions for associating the search query with a context, and instructions for providing to the client system, via the communications network, a response to the search query. The response includes a recommendation to join a discussion forum that corresponds to the context associated with the search query, and a list of user-selectable search results to the search query for concurrent display at the client system with the recommendation. The recommendation provided in the response includes a user-selectable link to an online location of the discussion forum, wherein the link to the online discussion is configured to direct an application executed by the client system to access the discussion forum via the communications network.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of a method and a related system for aggregating users are described. Based on changes in search queries from users (relative to existing search engine statistics), new networked discussion forums may defined. These forums may include chat rooms, blogs, email distribution lists or listserv discussion groups, instant messaging-based forums, and may utilize wireless networks as well as wired networks. In some embodiments, the network includes the Internet.

A user may be provided with invitations to join a new forum or an existing forum, and/or introductions to one or more individuals. These invitations and/or introductions may be based on information about the user's interests (such as registered information that user has previously provided), content of a document (such as an email received by the user), and/or the user's activities, such as a search query provided by the user, an application used by the user, and/or a location (for example as a web site or webpage) that the user visits. In particular, the user's interests, content of a document, and/or the user's activities may be used to determine a context that is associated with a forum, such as a chat room. The user may communicate with other members of such forums using a variety of protocols and communication techniques, such as Hyper Text Transfer Protocol (HTTP), email, voicemail and/or instant messaging. Such communication may be anonymous, i.e., the user's identity may be known to a host of the forum but may be unknown to other forum members.

Figure 1:
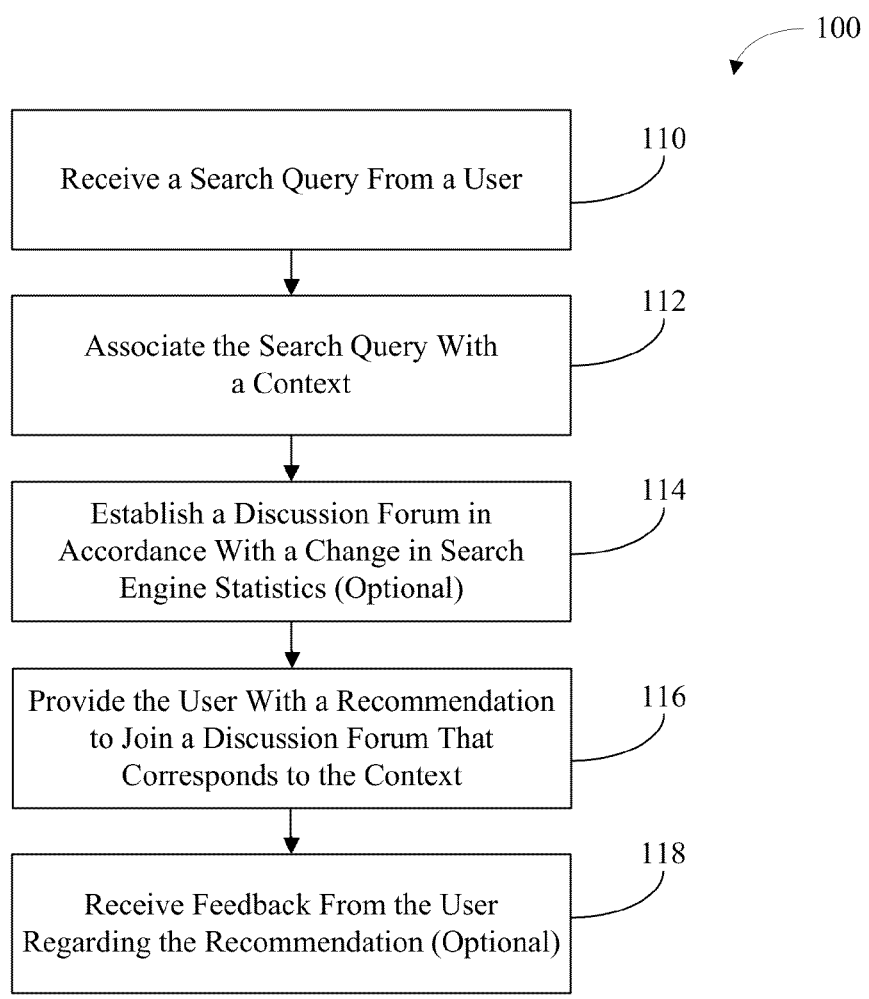
FIG. 1 is a flow diagram illustrating a method of aggregating users in accordance with some embodiments.

We now describe embodiments of systems and method for aggregating users. FIG. 1 is a flow diagram illustrating a computer-implemented method 100 of aggregating users, in accordance with some embodiments, that may be implemented on one or more servers (e.g., a search engine system) coupled to a user computer via a network. A search query is received from a user (110). For example, the search query is received by a search engine system, via a communications network, from a client system associated with the user. The search query is associated with a context (112). For example, the context may include a topic or subject, such as a recent event or news story. A discussion forum (such as a chat room, listserv group or other discussion forum) is optionally established in accordance with a change in search engine statistics (114) for the user and/or multiple users. The search engine statistics may correspond to the search query and/or the context. A recommendation to join a discussion forum that corresponds to the context is provided to the user (116). The recommendation may include a location (such as a web site or webpage URL) of the discussion forum or a pointer to the location (such as an HTML (Hypertext Markup Language) or XML (Extensible Markup Language) link) Feedback from the user regarding the recommendation is optionally received (118). This feedback may be explicit or implicit, such as whether or not the user accepted the recommendation or invitation to join the discussion forum. In some embodiments, the method includes providing to the client system, via the communications network, a response to the search query. The response includes a recommendation to join a discussion forum that corresponds to the context associated with the search query, and a list of user-selectable search results to the search query for concurrent display at the client system with the recommendation. The recommendation provided in the response includes a user-selectable link to an online location of the discussion forum, wherein the link to the online discussion is configured to direct an application executed by the client system to access the discussion forum via the communications network.

In the embodiment 100, two or more operations may be combined and/or the order of the operations may be changed. Furthermore, the embodiment 100 may include fewer operations or additional operations.

Figure 2:
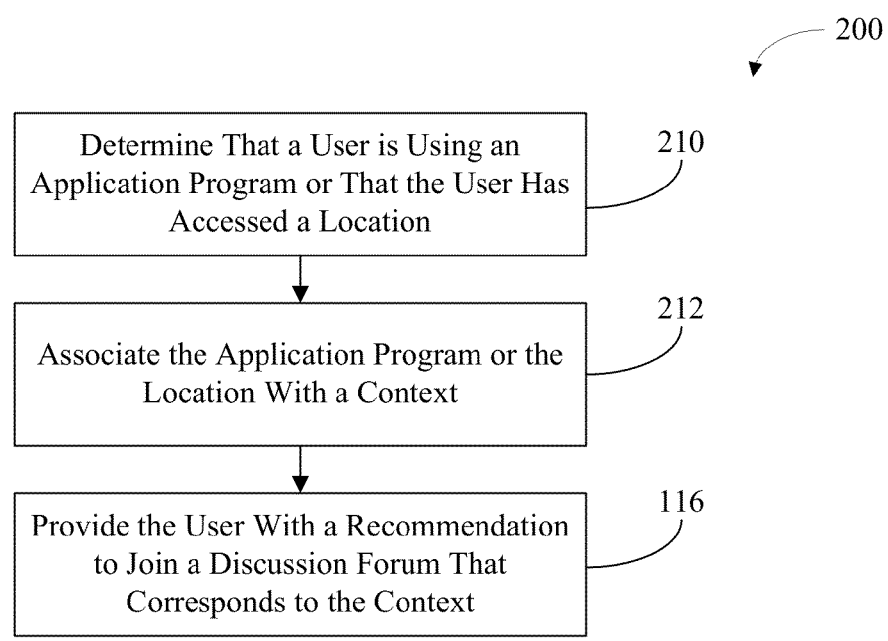
FIG. 2 is a flow diagram illustrating a method of aggregating users in accordance with some embodiments.

FIG. 2 is a flow diagram illustrating another embodiment of a computer-implemented method 200 of aggregating users. The method determines whether a user is using an application program (such as email), or it determines if the user has accessed a location (such as a web site or webpage) (210). In some embodiments, the location may correspond to advertising content, such as an embedded link, that is provided to the user in response to a search query received from the user. In other embodiments, the location may include a series of locations recently visited by the user (if the user consents to the tracking of such personalized information), for example, using the last N clicks made by the user. The application program or the location is associated with a context (212). For example, subject matter in an email or website may be associated with a topic based on the presence of one or more key words in the content of the email or website. A recommendation to join a discussion forum that corresponds to the context is provided to the user (116).

In method 100 or 200, two or more operations may be combined and/or the order of the operations may be changed. Furthermore, the method 100 or 200 may include fewer operations or additional operations.

In another embodiment (not illustrated), the user may be provided with the recommendation in accordance with the context and a registered interest of the user. For example, the user may have a user profile that indicates preferences or interests of the user, or a desire to receive alerts about certain topics. The user profile may include information explicitly provided by the user and/or information derived or inferred (with the user's permission) from the user's online activities. In some embodiments, the user may be introduced to other users who have similar interests in the identified context.

These embodiments may allow users who have less popular or less common interests to be identified and aggregated into discussion forums.

In contrast, in some embodiments search engine queries and changes in search engine statistics over time may be used to aggregate users whose online activities (e.g., search queries, web browsing, etc.) indicate common or popular interests in various topics. The topics may change and fluctuate rapidly. Search-engine-based embodiments, therefore, may be useful in identifying new discussion topics (the context), establishing new discussion forums (if necessary), and dynamically aggregating users into these or existing forums. Such forums may be of interest to these users over a short period of time (e.g., less than a month, or less than N months, where N is a predefined value) or over the long term. As such, the embodiments allow flexible social networks, for topics with audience sizes that range from mass interest to niches, to be established in real time.

These embodiments may eliminate a need for users to identify or find a discussion forum that is of interest. Furthermore, the recommendations or introductions occur while users are performing normal activities or tasks (such as browsing web pages on the Internet, reviewing results of search queries returned by a search engine, sending email messages, etc.) without having to visit a separate web site or webpage. Since the recommendations or introductions may be independent of the communication link being used by the various users, a wide variety of communication technologies and protocols may be used in the embodiments.

Figure 3:
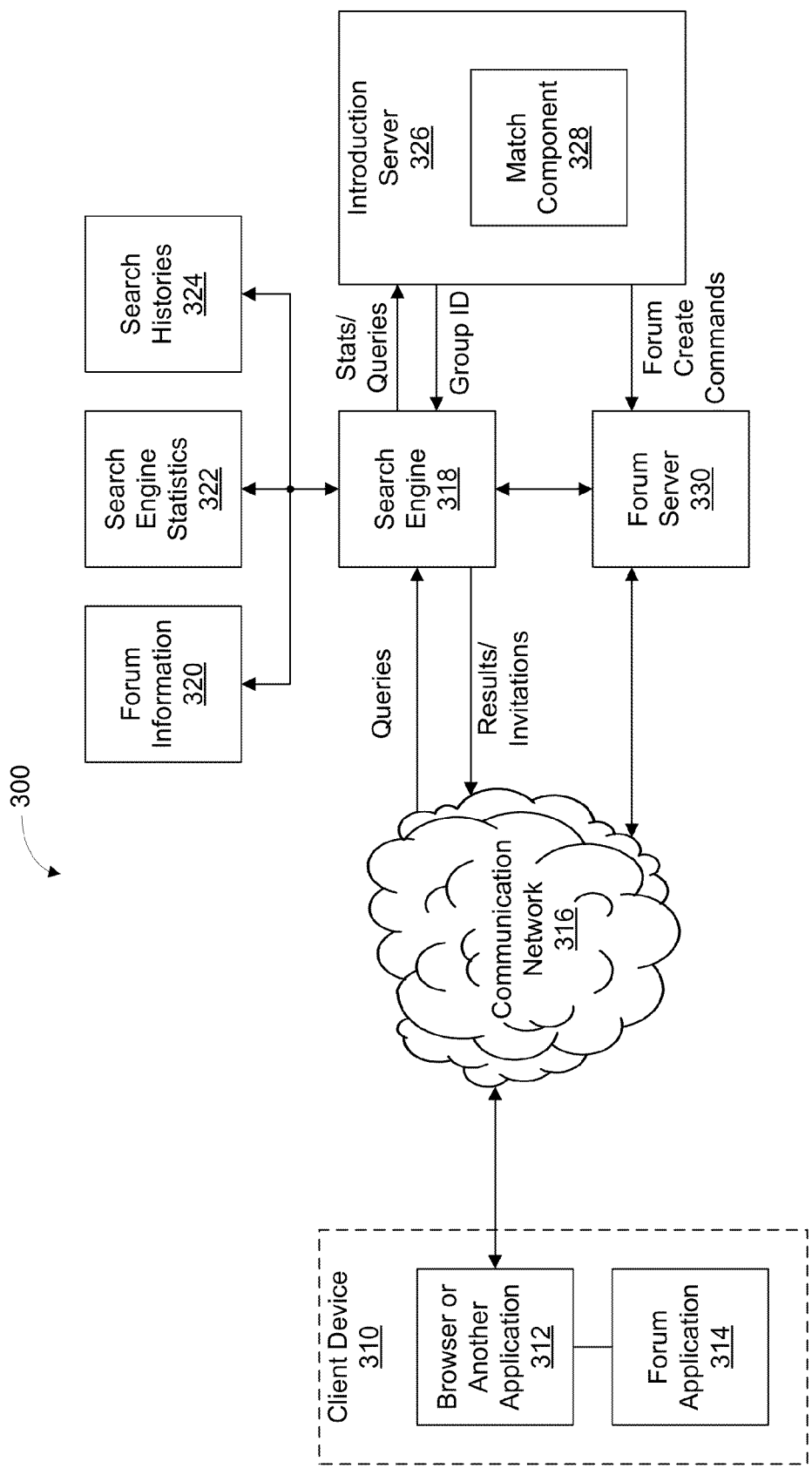
FIG. 3 is a block diagram illustrating a system in accordance with some embodiments.

FIG. 3 is a block diagram illustrating a system 300 in accordance with some embodiments. A user of a client device 310 (e.g., a desktop or laptop computer, a personal digital assistant, or a cellphone) may use online applications. For example, the client device 310 may include a program mechanism, such as a browser, a tool bar or another application 312, that is used to view content hosted, at least in part, on one or more servers. The client device 310 may be coupled to these servers via a communication network 316, such as an intranet and/or the Internet.

The user may use a search engine webpage to provide one or more queries to a search engine 318. The search engine 318 may provide the queries, as well as additional information, to an introduction server 326. The additional information may include search engine statistics 322 for multiple users, search histories 324 for the user (if the user has enabled or allowed storage and tracking of such personalized information) and information about one or more existing discussion forums 320.

The introduction server 326 may include a match component 328 that compares the frequency of a query (or of one or more terms in the query) with historical search engine statistics, such as corresponding baseline frequencies. For example, the difference between a frequency with which search queries are received from a first group of users during a first time interval and a frequency with which search queries are received from a second group of users during a baseline time interval that precedes the first time interval may be determined. In some embodiments, the search engine statistics further include variations in the baseline frequency as a function of time. In this way, periodic variations, such as seasonal or annual variations may be included in the analysis.

If a given query has a sufficient deviation from expected patterns (i.e., the relative frequency), and/or if the query has a large enough absolute frequency (for example, at least N occurrences per M units of time, where N and M are pre-defined values), the match component 328 may also determine a query expression corresponding to the query. Such expressions may exclude one or more stop words from the query (for example, articles), may include synonyms for one or more words or terms in the query, and/or may include multiple permutations on the order of the words or terms in the query expression. For example, unigram and bigram variations on words or terms in groups of up to four words or terms in the query may be included in the query expression.

The query expression may be compared with multiple contexts, such as topics or subjects. For example, a match score may be determined with a given context. This match score may be a weighted summation of matches between words or terms in the context and words or terms in the query expression. Different types of words or terms in the query expression may have different weights associated with them. Contexts that have match scores that exceed a pre-determined value or threshold may be associated with the query.

The introduction server 326 may also determine match scores between the identified context(s) and existing discussion forums. A user may be matched with a respective discussion forum, or the participants of the respective discussion forum, based on the match score for a given context and the forum. The introduction server 326 may also create one or more new forums and/or move existing users to such a new forum. The new forum may be created when one or more queries has a high rate of traffic but a poor match score with an existing forum (including any size constraints on the number of participants in such forums). For example, if there is a poor match between a query and existing forums for, say, five minutes, and the rate of traffic remains high, a new forum may be created. Furthermore, after creating an instance of the new forum, additional instances may be created (i.e., subdivision of the forum) if the traffic remains high. Criteria, such as location, may be used to assist in determining the appropriate instance(s) of the forum for the user.

Recommendations for forums, existing or new, for contexts that have large enough match scores may be provided to the user along with search engine results for one or more queries. As described further below with reference to FIGS. 4A-4F, the recommendations may be provided to the user in a window or pane or display region in a graphical user interface. In some embodiments, the recommendations may be ranked in accordance with the match score.

The user may accept one or more of the recommendations, such as that for a chat room. A forum server 330 in the system 300 may provide the user with one or more user interfaces to allow the user to participate in the chat room discussion, i.e., to view messages from other users and to provide his or her messages. The user may participate in these forums using a forum application 314 (e.g., a chat room client application, an instant messaging application, a web browser application, or any other suitable application) that executes on the client device 310.

When a user accepts a recommendation, the mechanism by which the user participates in a discussion may vary from one embodiment to another. For example, accepting a recommendation may cause a window of the forum application to open on the client device, or it may cause an embedded communication client to open within the application in which the recommendation is displayed. If the recommendation appears in a browser window and the forum application is the same browser application, then accepting a recommendation may cause a new window to be opened in the browser application. Yet other such mechanisms may be used in other embodiments.

The user response to the recommendations may form the basis of one or more quality metrics. Such quality metrics may include a click through metric (e.g., indicating how often various recommendations result in user acceptances (sometimes called clicks) of the recommendations), a participation metric (e.g., indicating how often various recommendations result in users who participate in corresponding forums—for example by sending at least one message to other participants in the forum), and/or a participation volume metric (e.g., indicating an average number of messages that users send before leaving such forums). One or more of the metrics may determine a usefulness of the recommendations and may be used to train the match component 328.

In some embodiments, other information may supplement or replace the query in determining the context(s). This information may include a user profile (from a number of different applications including a social networking application), a map address query, a local query (such as that for a near-by location), and/or a scholar query (such as that for an academic article or paper). Further, the additional information may include a zip code, a time zone, a geographic location, and/or an IP address. Using such information may allow the threshold for the absolute frequency of a query that may be of interest to be a relatively small number occurrences per minute (e.g., less than fifty occurrences per minute, such as ten occurrences per minute). In some embodiments the user may explicitly indicate that he or she would like to receive recommendations that correspond to a given query by using an identifier (i.e., a type of query, such as a recommendation query) in a webpage for a search engine. In some embodiments, a respective user may prevent the use of personal information, such as information in a user profile, from being used to make recommendations, by using an opt-in or opt-out mechanism. Alternately, in some embodiments, a respective user may be able to control which information about the user is used by the introduction server 326 or match component 328, for example by specifying categories, or types of information, or even specific items of information that are to be used or that are not to be used in determining recommendations for the respective user.

In some embodiments, the user may be allowed to join more than one forum simultaneously. For example, this may allow the user to participate in one discussion while waiting for another forum to fill up (i.e., to have more participants). Alternatively, the user may compare different discussions to see which one(s) are most interesting.

Furthermore, in some embodiments certain introductions may be blocked in accordance with a user's instructions (for example, if a safe search feature is enabled, or based on a language preference, the time, a number of desired recommendations per day, and/or geographic constraints). Depending of the forum type (such as chat rooms), recommendations (or an absence of a recommendation) may also be in accordance with an upper bound on the number of users at any one time in any given forum or instance of a forum.

Servers in the system 300, such as the forum server 300, may also monitor activity level in a forum and may block access by spammers (who may be identified based on excessive activity associated with a given cookie) or other blacklisted sources (which may be so identified based on user complaints). For example, the forum server may keep track of a number of users in any given forum. The invitation server may create or suppress invitations in accordance with the number of users in the respective forums. A respective forum that is temporarily empty may be maintained, and users may be recommended to join it, if statistics regarding the forum or the associated context(s) meet predefined criteria. In some cases, a respective forum may be maintained for use by current and prior users, but new recommendations to the forum may be suppressed. In some other cases, a respective forum may be maintained for use by current and prior users even if current online activity is producing few or no recommendations to the forum, so long as the ongoing forum usage meets predefined usage criteria (e.g., so long as there at least a threshold number of users per day, and/or at least a threshold number of new messages per day are submitted by users of the forum).

The interactions in the forums may be anonymous, i.e., the members of the forums may not know each others' true identity. However, the system 300 may know the members' identities. For example, users may need to login prior to joining any forum. To facilitate such anonymity, the introduction server 326 and/or the forum server 330 may generate personas for the members. In embodiments where a forum has an upper bound on the number of participants, a couple of hundred names or personas may be sufficient to reduce the probability of duplicate names.

In some embodiments, the recommendations and/or introductions may include commercial introductions, such as those associated with a paid service. The paid service may include paid search (where an organization pays to have an introduction made in response to one or more queries), sponsored forums, and/or advertising links.

The system 300 may include fewer components or additional components. Functions may be performed by different components than those described above. Furthermore, positions of one or more components may be changed, and two or more components may be combined into a single component.

To further understand the invention, several illustrative examples are now described. In one example, a user provides the query "britney spears." The introduction server 326 determines that this query has high frequency and a low match score with existing forums over a predefined period of time (e.g., N minutes, where N is sixty or less). In response, the introduction server 326 creates a new chat room to service this query. Subsequent queries for "britney spears", as well as related queries, such as "christina aguilera" may match this chat room. Queries for "britney spears" may have a predefined maximum match score with the new chat room.

In another example, a user submits a query q to a search engine. If this query has been frequently and recently performed by other users, and if there is an advertising budget for content from an advertiser corresponding to query q, an advertisement may be displayed on the right-hand-side of the browser window. The advertisement may indicate that it is a sponsored link and may include text such as "Connect with other users now searching for query q," as well as a link to a corresponding discussion group, such as a Google group.

The context need not be restricted to the query q. For example, queries may be grouped based on certain keywords. Thus, "car insurance," "auto insurance," and even "home insurance" may correspond to a context of "insurance."

In another example, a user is reading her email and sees an window labeled "Meet others." This type of embodiment is described further below with reference to FIG. 4F.

In another example, a user navigates to a web site that includes advertising. If there a budget for the corresponding advertiser has not yet been exhausted, an advertisement may be generated and displayed. For example, an advertisement may indicate "Find blogs about this site on Google" and may provide the corresponding link. Alternatively, there may be a pointer to a blogsearch index. Or there may be links to the blogs of other users who previously visited this web site.

Figure 4A:
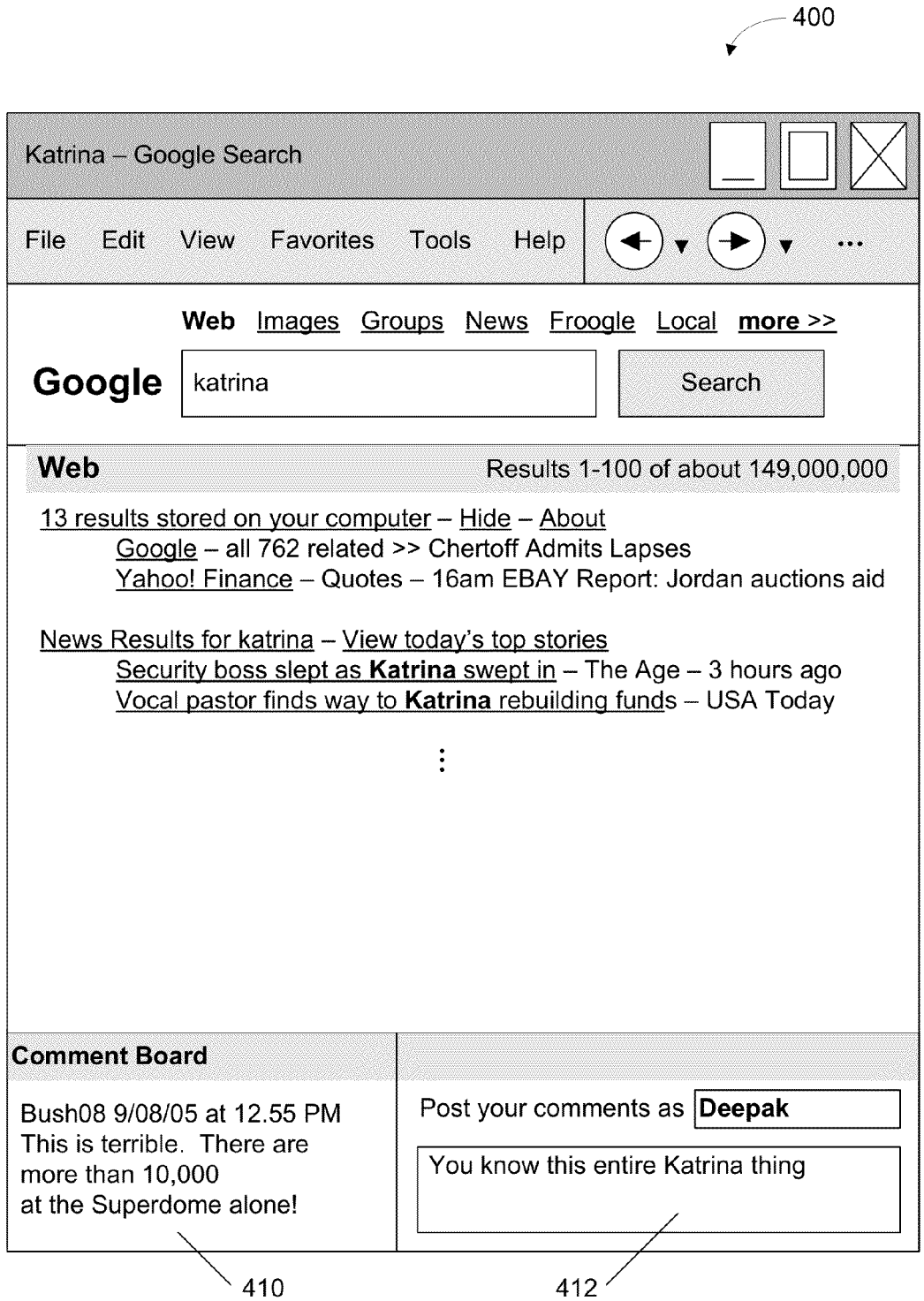
FIG. 4A is a block diagram illustrating a graphical user interface in accordance with some embodiments.

We now describe several embodiments of graphical user interfaces that provide recommendations to users, and allow users to participate in forums. FIG. 4A is a block diagram illustrating a graphical user interface 400 in accordance with some embodiments. User interface 400 illustrates a search engine webpage on a browser. In response to a user entering the query "katrina," search results are provided. These search results may include recommendations for one or more discussion forums.

The graphical user interface 400 illustrates a pane that includes windows 410 and 412, which may be displayed if the user selects one of the recommendations. Window 410 allows the user to view comments from other users. Window 412 allows the user to enter and post his or her comments.

In this embodiment, as well as in the embodiments illustrated below in FIGS. 4B-4F, there may be fewer or additional components, two or more components may be combined into a single component, and positions of one or more components may be changed.

Figure 4B:
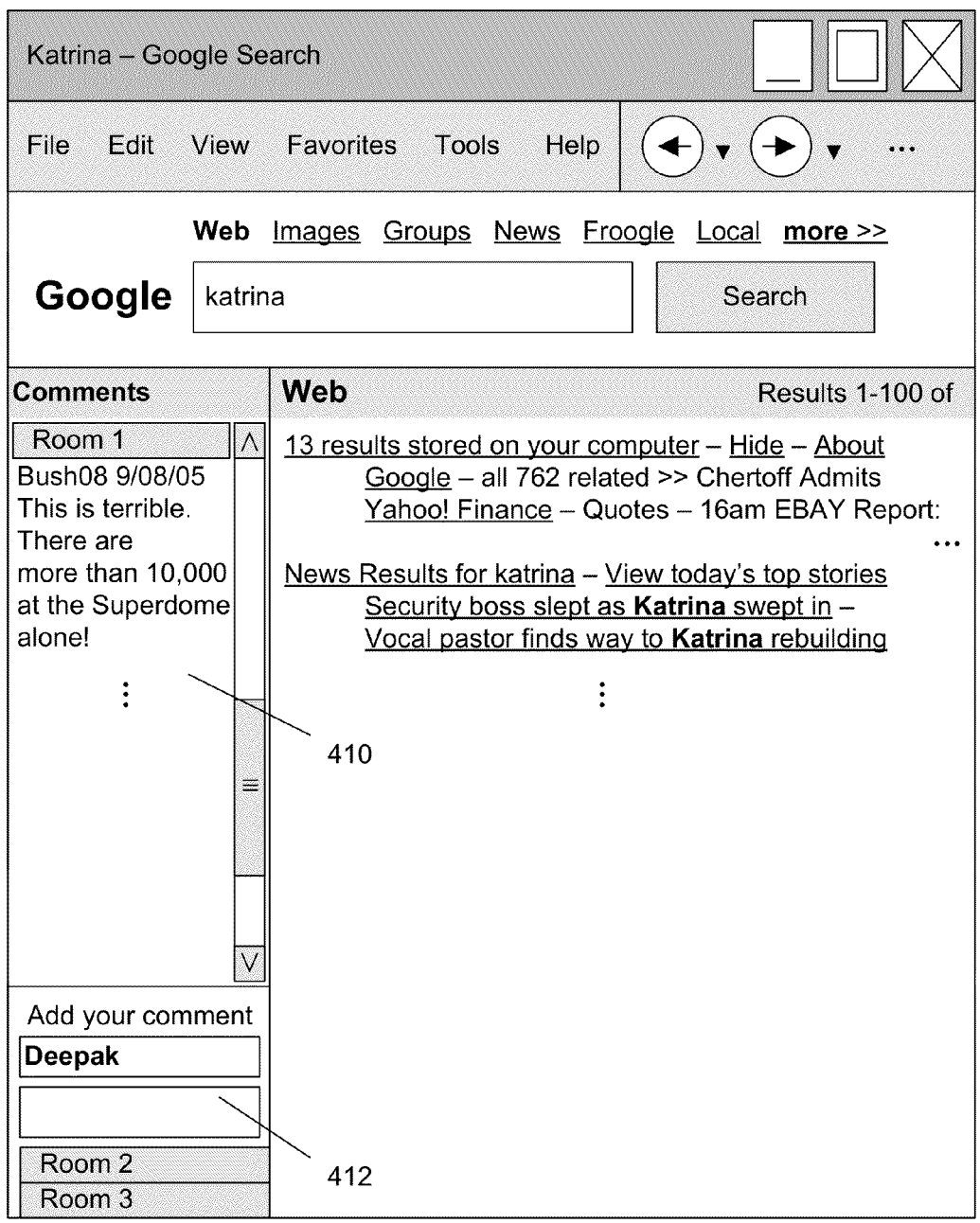
FIG. 4B is a block diagram illustrating a graphical user interface in accordance with some embodiments.

FIG. 4B is a block diagram illustrating a graphical user interface 420, in accordance with some embodiments, which is a variation on the preceding embodiments. In this illustration, the windows 410 and 412 are displayed on the left-hand side of the search engine webpage. In this example, the graphical user interface 420 also includes links to additional chat rooms (see "Room 2" and "Room 3" in window 412).

Figure 4C:
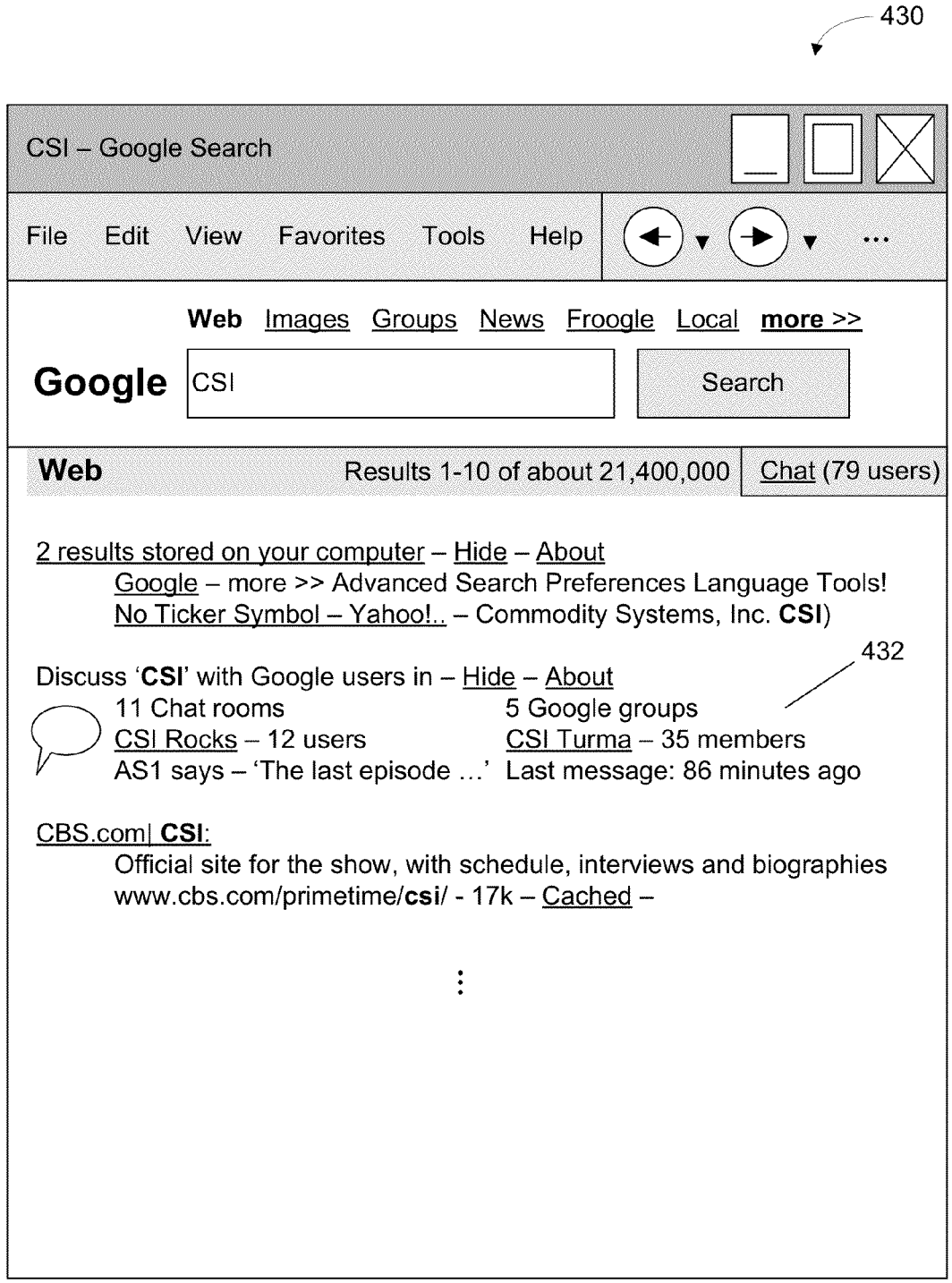
FIG. 4C is a block diagram illustrating a graphical user interface in accordance with some embodiments.

FIG. 4C is a block diagram illustrating a graphical user interface 430 in accordance with some embodiments. In response to a user entering the query "CSI," search results are provided. These search results include recommendations 432 for one or more discussion forums. These recommendations include links that, when activated, result in the display of additional messages windows corresponding to the discussion forums.

Figure 4D:
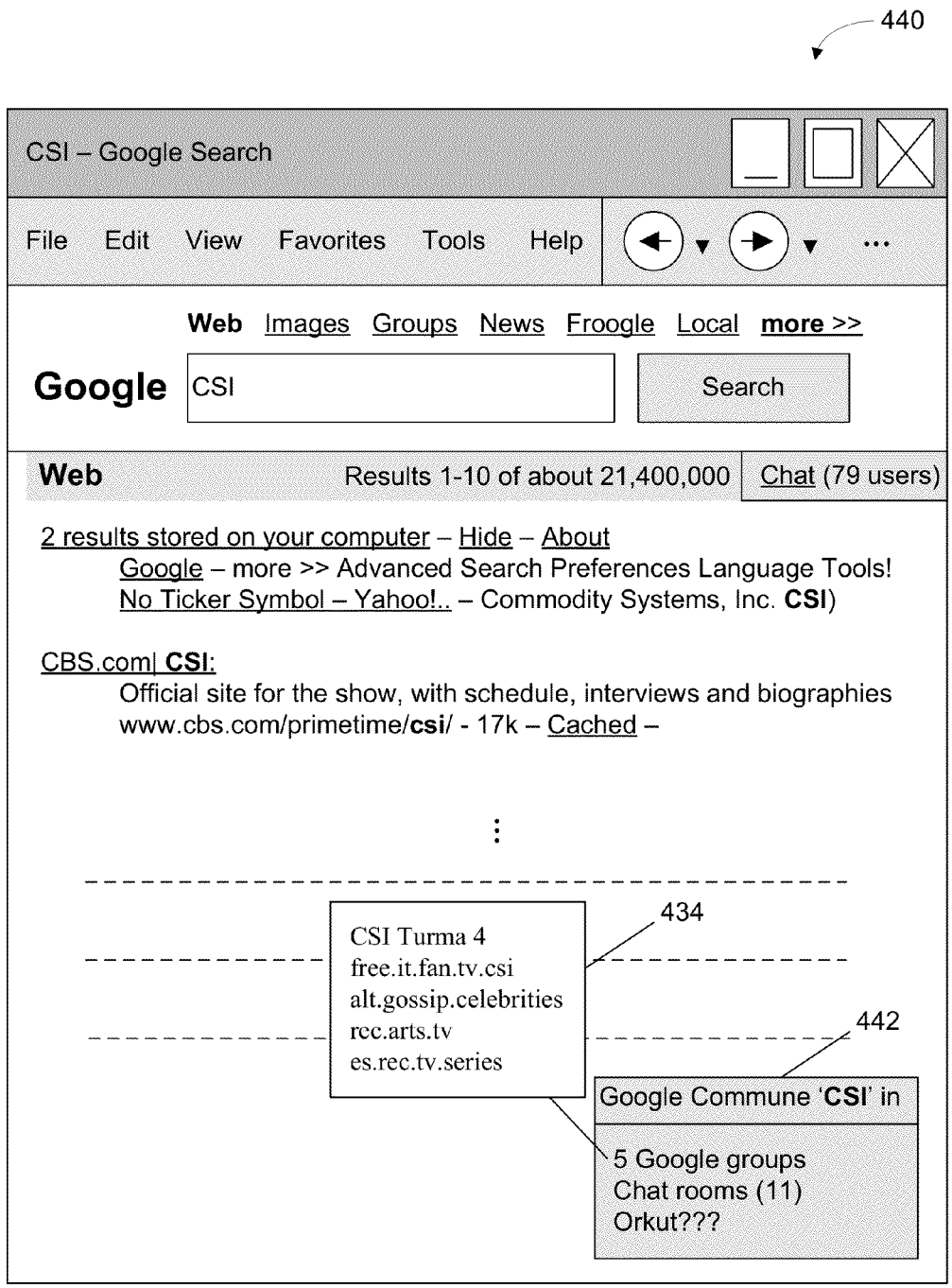
FIG. 4D is a block diagram illustrating a graphical user interface in accordance with some embodiments.

This is illustrated in FIG. 4D, which is a block diagram of a graphical user interface 440 in accordance with some embodiments. Having selected one of the links, a window 442 that includes summaries of multiple forums is displayed. By right clicking on window 442, another window 434 that includes links to the forums is displayed over the search engine results. The user may scroll through this window and select one or more of these forums to join.

Figure 4E:
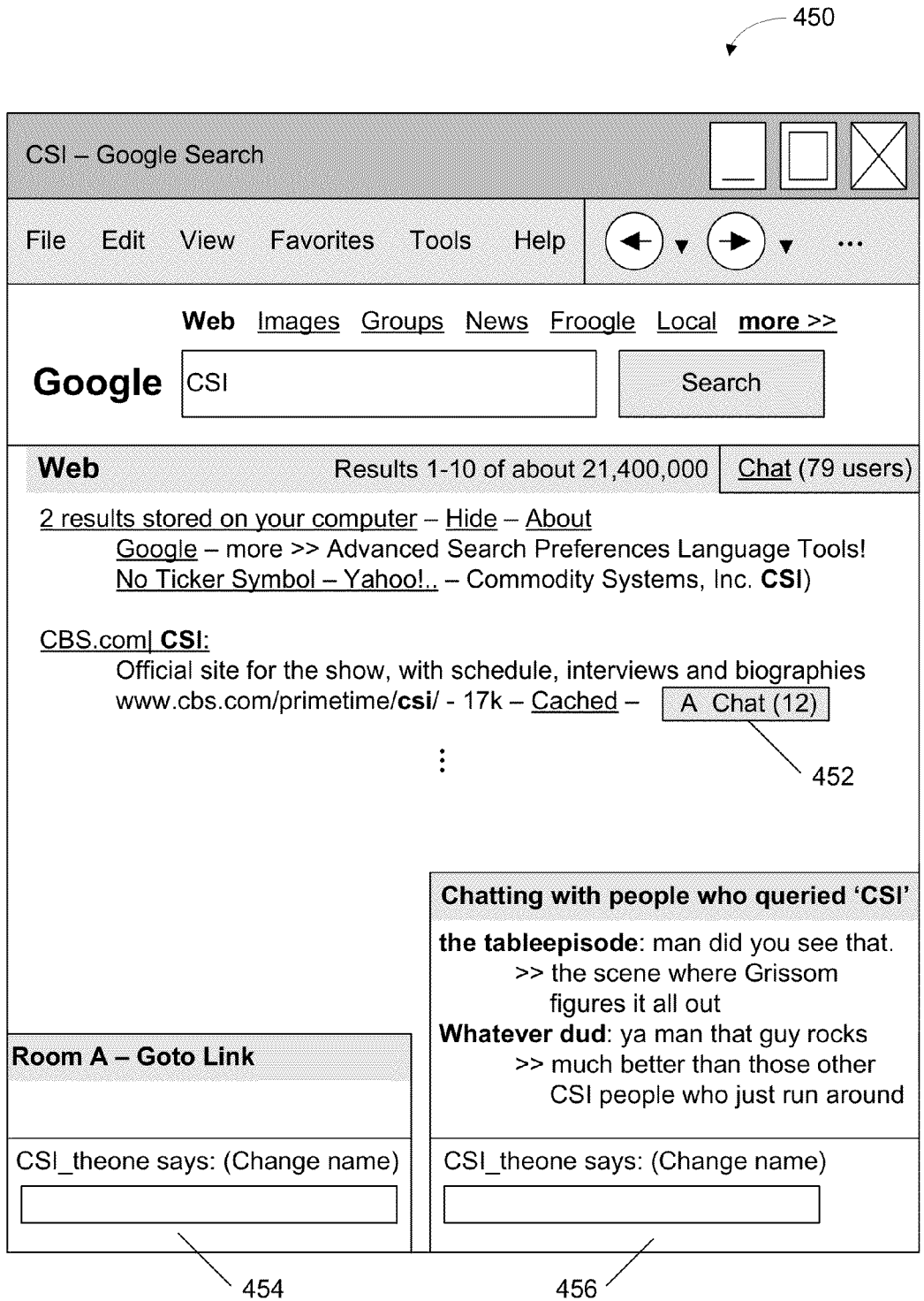
FIG. 4E is a block diagram illustrating a graphical user interface in accordance with some embodiments.

FIG. 4E is a block diagram illustrating a graphical user interface 450, in accordance with some embodiments, in which recommendations and links, such as recommendation 452, are displayed next to a corresponding search result. When a user selects such a recommendation, additional windows 454 and/or 456 may be displayed. The user may use these windows to participate in one or more discussion forums.

Figure 4F:
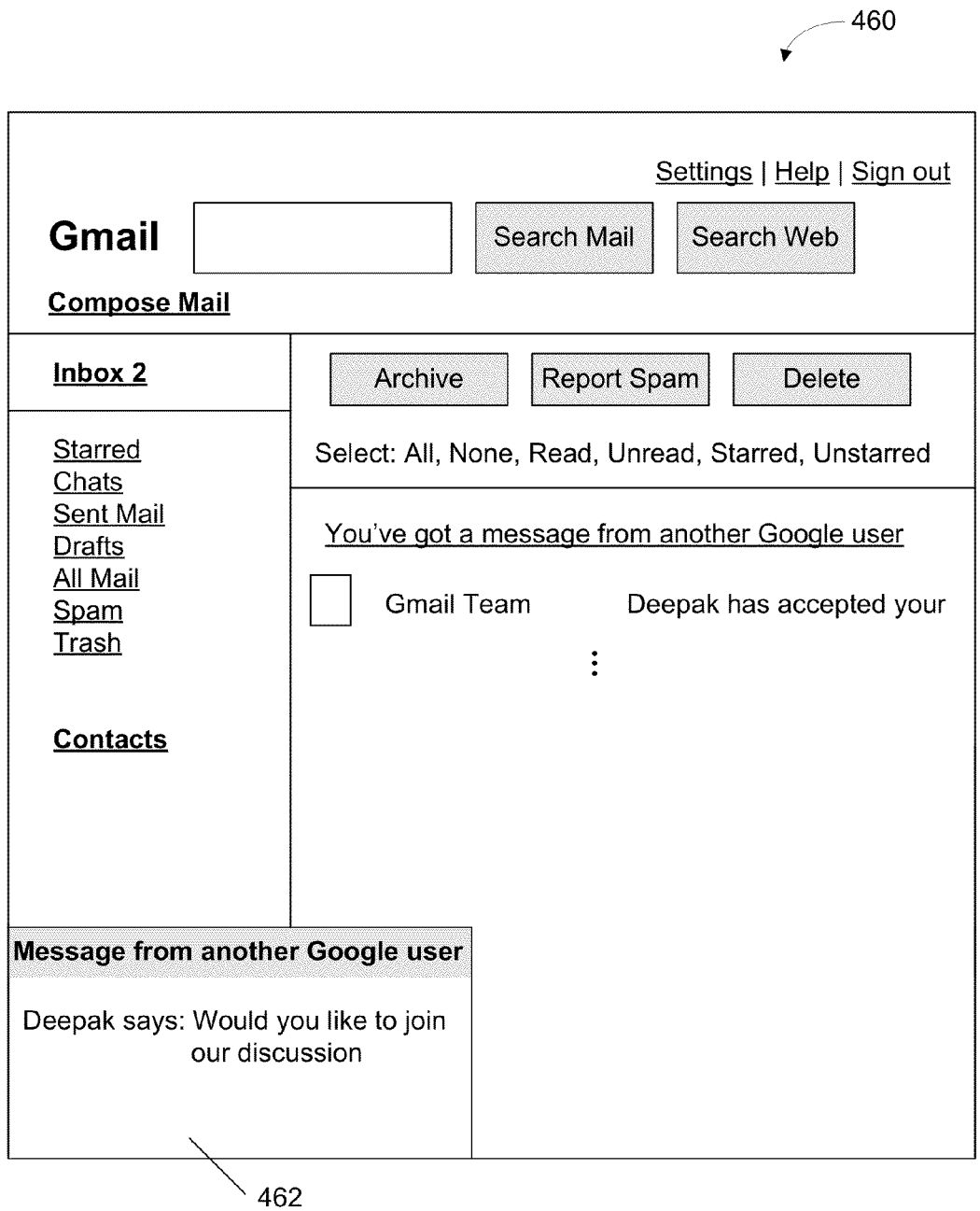
FIG. 4F is a block diagram illustrating a graphical user interface in accordance with some embodiments.

FIG. 4F is a block diagram illustrating a graphical user interface 460 in accordance with some embodiments. In this case, an email webpage is illustrated in a window. Using the content in one or more emails, a corresponding context is determined, and a recommendation 462 is provided. The recommendation 462 invites the user to join a discussion forum. If the user accepts the recommendation 462 (for example, by selecting a link), another window for the discussion forum may be displayed.

Figure 5:
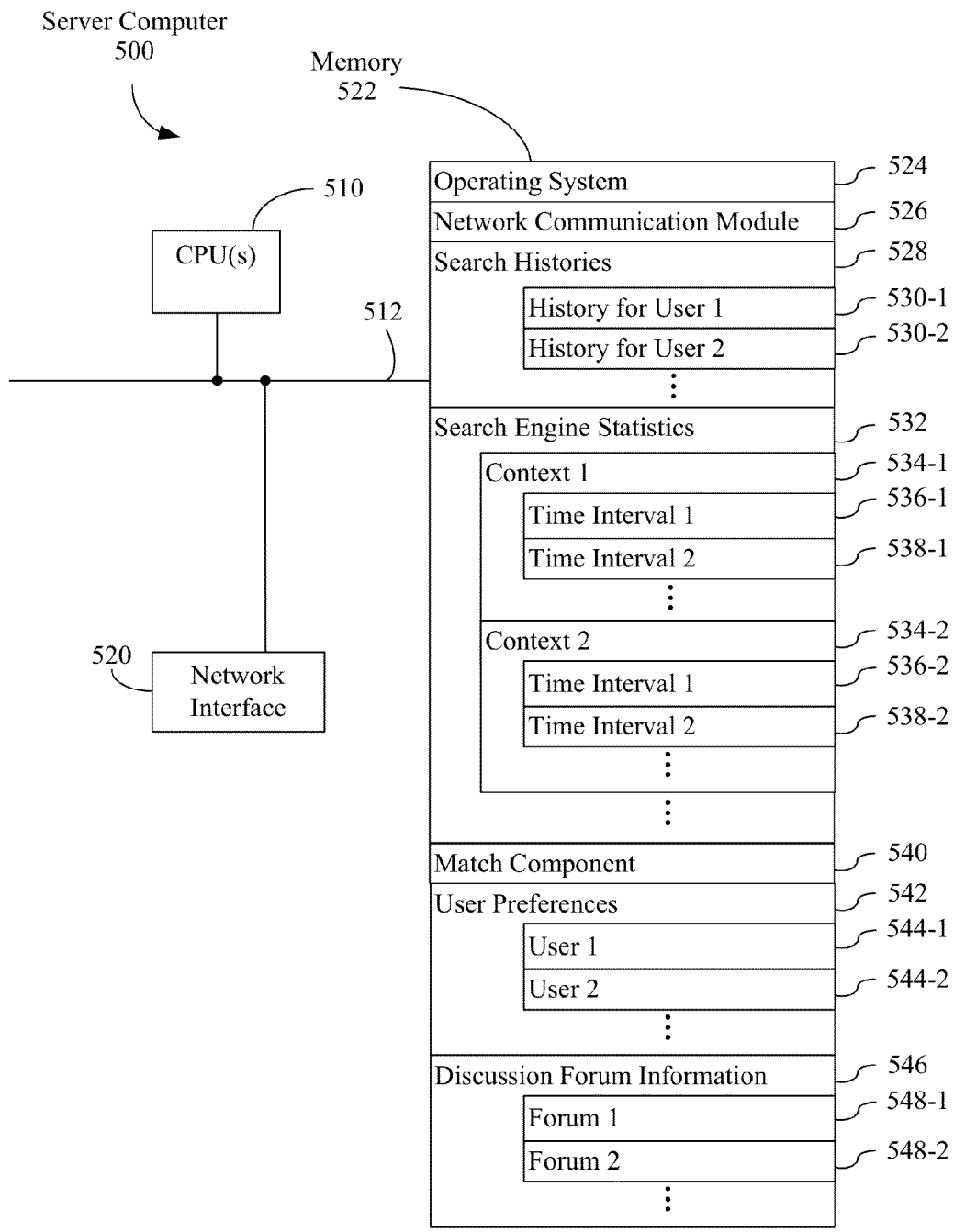
FIG. 5 is a block diagram illustrating a server computer in accordance with some embodiments.

We now describe embodiments of hardware and systems that may utilize and/or implement the process for aggregating users. FIG. 5 is a block diagram illustrating a server computer 500 in accordance with some embodiments. The server computer 500 includes at least one data processor or central processing unit (CPU) 510, a communications or network interface 520 for communicating with other computers, server computers and/or client computers or other client devices, memory 522 and one or more communication buses or signal lines 512 for coupling these components to one another. The communication buses 512 optionally include circuitry (sometimes called a chipset) that interconnects and controls communications between system components.

Memory 522 includes high-speed random access memory, such as DRAM, SRAM, DDR RAM or other random access solid state memory devices, and/or non-volatile memory, such as one or more magnetic disk storage devices, optical disk storage devices, flash memory devices, or other non-volatile solid state storage devices. Memory 522, or alternately the non-volatile memory device(s) within memory 522, comprises a non-transitory computer readable storage medium. In some embodiments, memory 522 stores an operating system 524, such as LINUX, UNIX or WINDOWS, that includes procedures (or a set of instructions) for handling basic system services and for performing hardware dependent tasks. Memory 522 also optionally stores communication procedures (or a set of instructions) in a network communication module 526. The communication procedures are used for communicating with one or more client computers or other client devices.

Memory 522 also optionally includes search histories 528 for one or more users 530, search engine statistics 532, match component (or a set of instructions) 540, user preferences 542 for one or more users 544, and discussion forum information 546 for forums 548. The search engine statistics 532 may include statistics for one or more time intervals 536, 538 for each of one or more contexts 534.

Modules and applications identified above correspond to sets of instructions for performing the functions described above. These modules (i.e., sets of instructions) need not be implemented as separate software programs, procedures or modules. The various modules and sub-modules may be rearranged and/or combined. The above identified data structures need not be implemented separately. The various data structures may be rearranged and/or combined. Memory 522 optionally stores additional data structures, modules and/or sub-modules, or fewer data structures, modules and/or sub-modules. Memory 522, therefore, may include a subset or a superset of the above identified data structures, modules and/or sub-modules. For example, one or modules, sub-modules and/or data structures may be implemented on one or more additional server computers.

In some other embodiments, server 500 stores statistics 532 and other information for one or more applications (e.g., new stories, blog stories, topics discussed in user groups) other than (or in addition to) a search engine.

Figure 6:
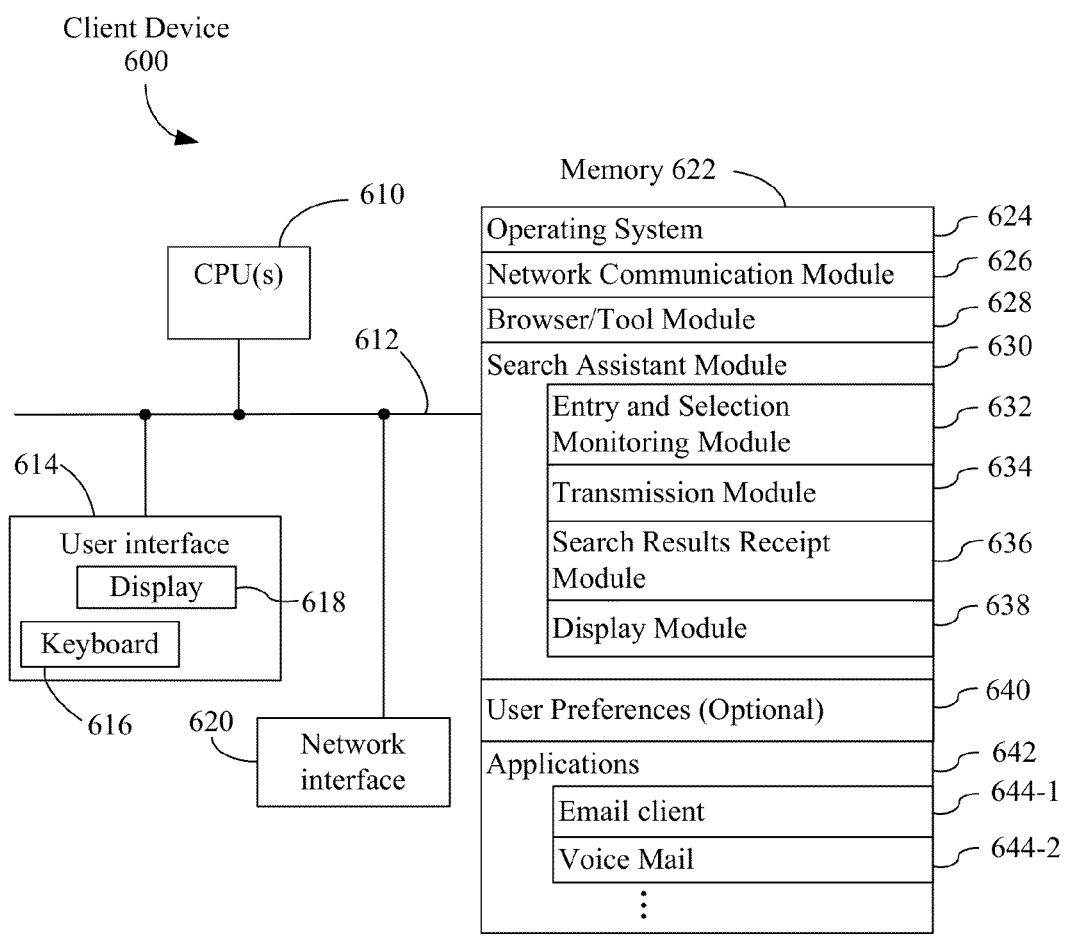
FIG. 6 is a block diagram illustrating a client device in accordance with some embodiments.

FIG. 6 is a block diagram illustrating a client device 600 in accordance with some embodiments. The client device 600 includes at least one data processor or central processing unit (CPU) 610, one or more optional user interfaces 614, a communications or network interface 620 for communicating with other computers, such as server computers and/or client computers or other client devices, memory 622 and one or more communication buses or signal lines 612 for coupling these components to one another. The communication buses 612 optionally include circuitry (sometimes called a chipset) that interconnects and controls communications between system components. The user interface 614 optionally includes one or more keyboards 616, one or more pointer devices (not shown), such as a mouse, and/or one or more displays 618.

Memory 622 includes high-speed random access memory, such as DRAM, SRAM, DDR RAM or other random access solid state memory devices, and/or non-volatile memory, such as one or more magnetic disk storage devices, optical disk storage devices, flash memory devices, or other non-volatile solid state storage devices. Memory 622, or alternately the non-volatile memory device(s) within memory 622, comprises a non-transitory computer readable storage medium. In some embodiments, memory 622 stores an operating system 624, such as LINUX, UNIX or WINDOWS, that includes procedures (or a set of instructions) for handling basic system services and for performing hardware dependent tasks. Memory 622 optionally stores communication procedures (or a set of instructions) in a network communication module 626. The communication procedures are used for communicating with one or more server computers.

Memory 622 also optionally includes a browser module (or a set of instructions) 628, a search assistant module (or a set of instructions) 630, optional user preferences 640, and optional applications (or sets of instructions) 642, such as an email client application 644-1 and voicemail 644-2. In some implementations, search assistant module 630 includes an entry and selection monitoring module (or a set of instructions) 632, a transmission module (or a set of instructions) 634, search results receipt module (or a set of instructions) 636, and a display module (or a set of instructions) 638. In some embodiments, one or more of the search assistant modules may be implemented, in part or in whole, within the browser module 628 or within extensions or toolbars of the browser module. In some embodiments, one or more of the search assistant modules may be implemented, in part or in whole, by instructions embedded within one or more webpages rendered by the browser module. For example, the one or more webpages may include instructions written in JavaScript™ (a trademark of Sun Microsystems, Inc.), ECMAScript (the specification for which is published by the European Computer Manufacturers Association International), VBScript™ (a trademark of Microsoft, Inc.), Adobe Flash, and/or any other client-side scripting language.

Modules and applications identified above correspond to a set of instructions for performing one or more functions described above. These modules (i.e., sets of instructions) need not be implemented as separate software programs, procedures or modules. The various modules and sub-modules may be rearranged and/or combined. The above identified data structures need not be implemented separately. The various data structures may be rearranged and/or combined. Memory 622 may include additional data structures, modules and/or sub-modules, or fewer data structures, modules and/or sub-modules. Memory 622, therefore, may include a subset or a superset of the above identified data structures, modules and/or sub-modules.

In some other embodiments, client device 600 may store statistics 532 and other information for one or more applications (e.g., new stories, blog stories, topics discussed in user groups) other than (or in addition to) a search engine.

Figure 7:
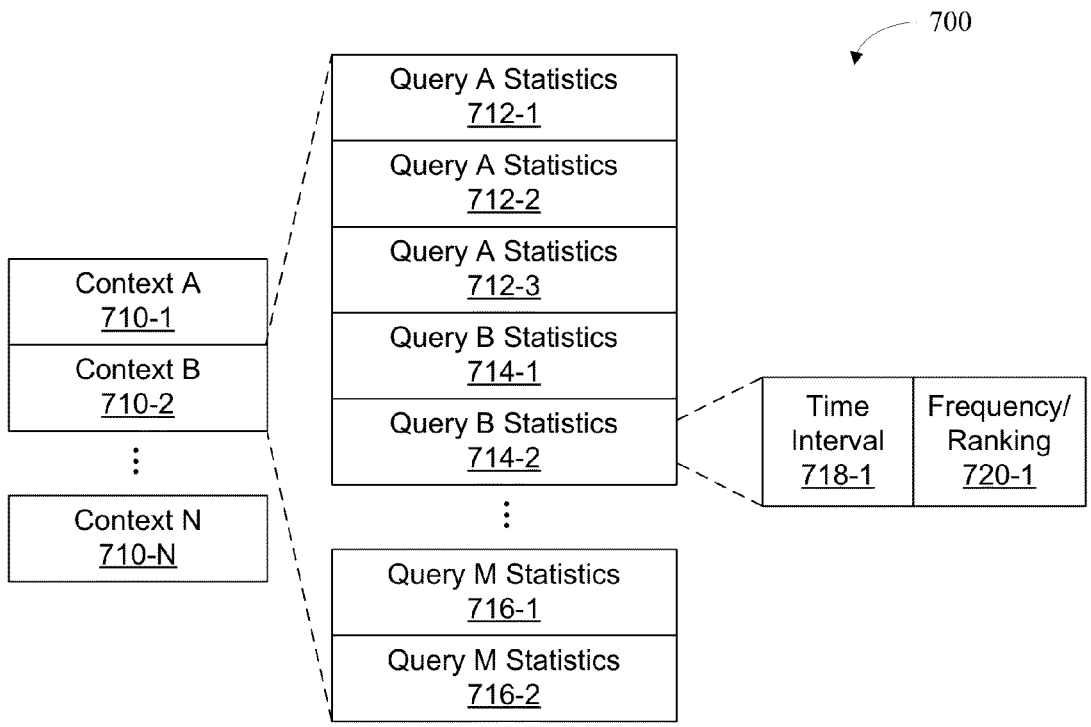
FIG. 7 is a block diagram illustrating a popularity statistics data structure in accordance with some embodiments.

We now describe data structures for use in systems that implement methods for aggregating users. FIG. 7 is a block diagram illustrating a statistics data structure 700 in accordance with some embodiments. The data structure 700 includes multiple contexts 710. A given context, such as context B 710-2, may be associated with multiple queries. Statistics for these queries 712, 714 and 716 may be included in the data structure 700. Respective query statistics, such as query B statistics 714-2 may include a time interval 718-1 over which the statistics were determined and frequency and/or ranking information 720-1. In some embodiments, the statistics used by the introduction server are news story statistics, blog statistics, user group discussion topic statistics, or any other statistics that may be used to identify topics of potential interest to users, and thus are not limited to search engine statistics. A respective context 710 is associated with multiple underlying items, such as new stories or blog stories, which may come from one or multiple servers or online applications or other sources. In other embodiments, a statistics data structure optionally includes fewer or additional elements, two or more elements may be combined, and/or a position of one or more of the elements may be changed.

Figure 8:
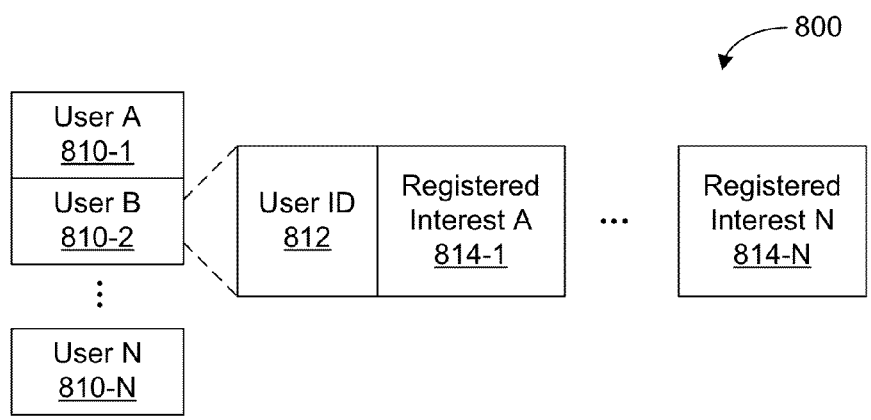
FIG. 8 is a block diagram illustrating a data structure in accordance with some embodiments.

FIG. 8 is a block diagram illustrating a user preferences data structure 800 in accordance with some embodiments. In some implementations, data structure 800 is used to store preferences for multiple users 810. In some embodiments, the user preferences data structure 800 contains user profiles, while in other embodiments, the user preferences data structure 800 is separate from or comprises a portion of a set of user profiles. Entries for a respective user, such as the entry for user B 810-2, may include a user identifier 812, as well as multiple registered interests 814 for the user. A respective registered interest 814 may be represented by a category identifier, or by a set of one or more keywords, and may optionally include a weight value that indicates the strength of the user's interest in this category or topic relative to the user's other registered interests. In other embodiments, a user preferences data structure 800 may include fewer or additional elements (e.g., additional user profile information), two or more elements may be combined, and/or a position of one or more of the elements may be changed.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for dynamically aggregating users, performed by a search engine system having one or more processors and memory storing one or more programs that are executed by the one or more processors to enable the search engine system to perform the method, the method comprising:
   automatically establishing a new discussion forum in response to a change in search engine statistics;
   receiving at the search engine system, via a communications network, a search query from a client system associated with a user;
   associating the search query with a context; and
   providing to the client system, via the communications network, a response to the search query, the response including:
      a recommendation to join a discussion forum for the context associated with the search query, wherein the discussion forum comprises the new discussion forum and the recommendation includes a user-selectable link to an online location of the discussion forum, wherein the user-selectable link to the online location of the discussion forum is configured to direct an application executed by the client system to access the discussion forum via the communications network, and
      a list of user-selectable search results to the search query for concurrent display at the client system with the recommendation;
   wherein the context is distinct from the user-selectable search results and distinct from the recommendation to join the discussion forum.

2. The method of claim 1, wherein the change in the search engine statistics includes a difference between a first frequency and a baseline frequency, the first frequency comprising a frequency with which search queries corresponding to the context are received from a first plurality of users during a first time interval, and the baseline frequency comprising a frequency with which search queries corresponding to the context are received from a second plurality of users during a baseline time interval that precedes the first time interval.

3. The method of claim 2, wherein the change in the search engine statistics further includes variations in the baseline frequency as a function of time.

4. The method of claim 1, wherein the user-selectable link to an online location of the discussion forum comprises a link to a chat room.

5. The method of claim 1, wherein the associating includes determining a match score between the context and one or more query terms in the search query.

6. The method of claim 1, wherein the associating includes determining one or more synonyms for one or more query terms in the search query.

7. The method of claim 1, wherein the associating is in accordance with search histories of a plurality of users.

8. The method of claim 1, wherein the associating is in accordance with registered interests of the user.

9. The method of claim 1, further comprising receiving feedback from the user regarding the recommendation.

10. The method of claim 1, wherein the search query is received by the search engine system via a window in a search engine graphical user interface at the client system and the response to the search query, including the list of search results and the recommendation, is provided to the user via the window in a search engine graphical user interface at the client system.

11. A search engine system, comprising:
one or more processors;
memory storing one or more programs for execution by the one or more processors, the one or more programs including:
instructions for automatically establishing a new discussion forum in response to a change in search engine statistics;
instructions for receiving at the search engine system, via a communications network, a search query from a client system associated with a user;
instructions for associating the search query with a context; and
instructions for providing to the client system, via the communications network, a response to the search query, the response including:
a recommendation to join a discussion forum for the context associated with the search query, wherein the discussion forum comprises the new discussion forum and the recommendation includes a user-selectable link to an online location of the discussion forum, wherein the user-selectable link to the online location of the discussion forum is configured to direct an application executed by the client system to access the discussion forum via the communications network, and
a list of user-selectable search results to the search query for concurrent display at the client system with the recommendation;
wherein the context is distinct from the user-selectable search results and distinct from the recommendation to join the discussion forum.

12. The search engine system of claim 11, wherein the change in the search engine statistics includes a difference between a first frequency and a baseline frequency, the first frequency comprising a frequency with which search queries corresponding to the context are received from a first plurality of users during a first time interval, and the baseline frequency comprising a frequency with which search queries corresponding to the context are received from a second plurality of users during a baseline time interval that precedes the first time interval.

13. The search engine system of claim 12, wherein the change in the search engine statistics further includes variations in the baseline frequency as a function of time.

14. The search engine system of claim 11, wherein the instructions for associating the search query with a context include instructions for determining a match score between the context and one or more query terms in the search query.

15. A non-transitory computer readable storage medium storing one or more programs configured for execution by a search engine system having one or more processors, the one or more programs comprising:
instructions for automatically establishing a new discussion forum in response to a change in search engine statistics;
instructions for receiving at the search engine system, via a communications network, a search query from a client system associated with a user;
instructions for associating the search query with a context; and
instructions for providing to the client system, via the communications network, a response to the search query, the response including:
a recommendation to join a discussion forum for the context associated with the search query, wherein the discussion forum comprises the new discussion forum and the recommendation includes a user-selectable link to an online location of the discussion forum, wherein the user-selectable link to the online location of the discussion forum is configured to direct an application executed by the client system to access the discussion forum via the communications network, and
a list of user-selectable search results to the search query for concurrent display at the client system with the recommendation;
wherein the context is distinct from the user-selectable search results and distinct from the recommendation to join the discussion forum.

16. The non-transitory computer readable storage medium of claim 15, wherein the change in the search engine statistics includes a difference between a first frequency and a baseline frequency, the first frequency comprising a frequency with which search queries corresponding to the context are received from a first plurality of users during a first time interval, and the baseline frequency comprising a frequency with which search queries corresponding to the context are received from a second plurality of users during a baseline time interval that precedes the first time interval.

17. The non-transitory computer readable storage medium of claim 16, wherein the change in the search engine statistics further includes variations in the baseline frequency as a function of time.

18. The non-transitory computer readable storage medium of claim 15, wherein the instructions for associating the search query with a context include instructions for determining a match score between the context and one or more query terms in the search query.

19. A method for dynamically aggregating users, performed by a search engine system having one or more processors and memory storing one or more programs that are executed by the one or more processors to enable the search engine to perform the method, comprising:
  automatically establishing a new discussion forum in response to a change in search engine statistics;
  receiving at the search engine system, via a communications network, a first search query from a first client system associated with a first user;
  associating the first search query with a first context;
  receiving at the search engine system, via a communications network, a second search query from a second client system associated with a second user;
  associating the second search query with the first context;
  after associating the first search query with the first context, providing to the first client system, via the communications network, a response to the first search query, the response to the first search query including:
    a recommendation to join a discussion forum for the first context, wherein the discussion forum comprises the new discussion forum and the recommendation includes a user-selectable link to an online location of the discussion forum, wherein the link to the online location of the discussion forum is configured to direct an application executed by the first client system to access the discussion forum via the communications network, and
    a list of user-selectable search results to the first search query for concurrent display at the first client system with the recommendation, wherein the first context is distinct from the user-selectable search results and distinct from the recommendation to join the discussion forum; and
  after associating the second search query with the first context, providing to the second client system, via the communications network, a response to the second search query, the response to the second search query including:
    said recommendation to join said discussion forum that corresponds to the first context, and
    a list of user-selectable search results to the second search query for concurrent display at the second client system with said recommendation.

\* \* \* \* \*